Sept. 24, 1929.  H. T. PATTON  1,729,486
CONTROLLING SYSTEM AND VALVE APPARATUS THEREFOR
Filed Oct. 23, 1922.
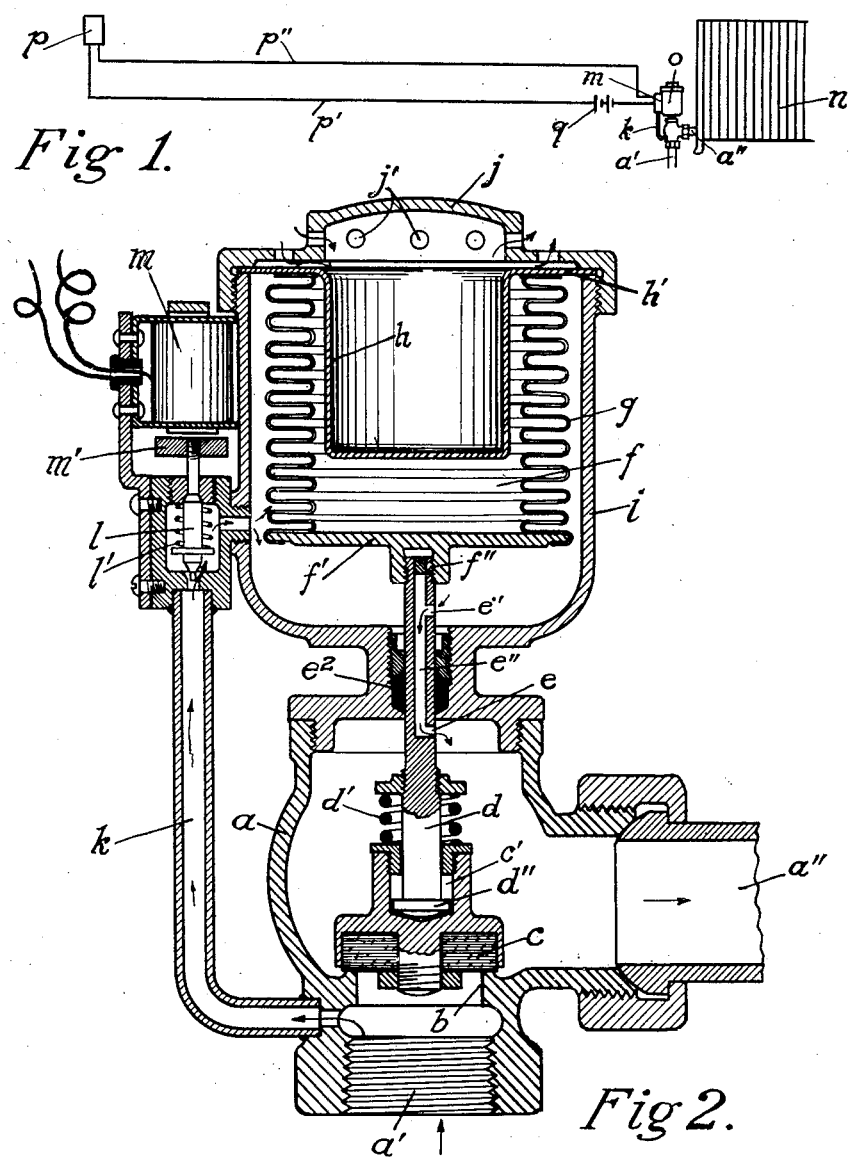
Hal T. Patton, INVENTOR.
BY
ATTORNEY.

Patented Sept. 24, 1929

1,729,486

UNITED STATES PATENT OFFICE

HAL T. PATTON, OF CLEVELAND, OHIO

CONTROLLING SYSTEM AND VALVE APPARATUS THEREFOR

Application filed October 23, 1922. Serial No. 596,281.

My invention relates to improvements in controlling system and valve apparatus therefor, and has for its object the provision of simple, efficient and inexpensive apparatus for the thermostatic control of a fluid-heating medium. More specifically, my invention contemplates the provision of an improved controlling valve appliance adapted for steam heating systems, and the like, which shall be capable of thermostatic control and actuation directly from the heat supply of the system, whereby complicated and expensive air-pressure actuating means, or the substitute therefor, may be eliminated.

In the embodiment of my invention, herein illustrated and described, the main controlling valve for the steam line is connected with a suitable expansion chamber preferably containing a volatile liquid, and through the heating and cooling of said chamber and its contents, said valve is opened and closed. The expansion chamber is adapted to be intermittently connected with the steam line, whereby said liquid may be volatilized, thereby causing the expansion of said chamber and the movement of the connected valve-part. The steam or other heat-conveying medium is given access to the expansion chamber, or is cut off therefrom by a thermostatically-controlled valve preferably positioned in a by-pass from the steam line. Moreover, a controllable vent or leak may be provided in the casing enclosing the expansion chamber in order to insure a continuing period of volatilization for its contents, while cooling means for rapidly dissipating the heat from said chamber may advantageously be associated with the expansion chamber to insure quick actuation for the valve.

Further details of the preferred embodiment of my invention and the uses and purposes thereof may best be explained by making reference to the accompanying drawings, wherein:

Fig. 1 is a diagrammatic view illustrating the thermostatically-controlled system to which my invention is applied for the purpose of explanation, and, Fig. 2 is a vertical sectional view of a valve appliance also embodying my invention.

The same character of reference is applied to each figure of the drawings, where applicable, for the purpose of designating similar parts illustrated therein.

Referring first to the showing of Fig. 2, it will be seen that an automatically controllable valve having certain novel features of construction is shown in enlarged vertical section. The valve casing $a$ contains the valve seat $b$ which is closed by the vertically movable valve-part $c$, thereby controlling the flow of steam or other fluid heating medium from the inlet $a'$ to the exit $a''$ of said valve casing. A valve stem $d$ provided with a spring $d'$ and an expanded head $d''$ is afforded material play or lost motion within the bore $c'$ of the valve-part to afford sufficient retraction of the stem and close the lateral vent $e$ before the valve-part is lifted from its seat. The vent or leak $e$ is connected with an inlet opening $e'$ near the upper end of stem $d$ by means of the longitudinal bore or passage $e''$ provided in said valve stem; the parts being so proportioned that the vent $e$ may be closed by retracting it within the gland of the valve in an intermediate position of the valve stem.

Within the head $f'$ of the hermetically sealed expansion chamber $f$ is provided a tapped socket $f''$ wherein the upper end of the valve stem $d$ is screwed for the purpose of actuating the valve and controlling the vent. Said expansion chamber is provided with corrugated side walls $g$ sealed at their lower end to the head $f'$ and at their upper end to the flange $h'$ of the reentering cooling cell $h$. Closely enclosing the expansion chamber is a closed casing $i$ upon which is screwed a perforated cover $j$ having openings $j'$ to permit the circulation of air within the cooling cell $h$. This cell, under normal conditions, will serve to maintain the volatile fluid within the expansion chamber, such as alcohol, for example, which is provided as the reacting medium therein when vaporized, in a fluid state.

A by-pass $k$ is connnected between the valve casing $a$ beyond its valve-seat and the casing $i$ of the expansion chamber. Interposed therein is a valve $l$ normally closed by its spring $l'$, but adapted to be opened against the tension of said spring by the electromagnet $m$ and its connected armature $m'$. The circuit of said electromagnet may be closed in any desired manner for effecting the direct control of the valve $l$ and the indirect control of the main or steam valve, as will be further explained.

It will be noted that Fig. 2 of the drawings illustrates valve $l$ opened, so that the steam has access by way of by-pass $k$ to casing $i$ and its contained expansion chamber. In addition, the admitted steam is afforded a slight vent or leak from the casing $i$ into the upper portion of the valve casing $a$ by way of the inlet $e'$, passage $e''$ and exposed vent $e$. This serves to maintain a sufficiently high temperature within the expansion chamber to volatilize its fluid contents and insure the depression of the valve stem and the seating of valve-part $c$, thereby closing the main or controlled steam valve.

These conditions continue as long as the circuit is maintained closed through electromagnet $m$, but immediately this circuit is opened, the spring $l'$ will close valve $l$ of the by-pass $k$ and the accelerated dissipation of heat from the vaporous contents of the expansion chamber, which is insured by the cooling cell $h$, serves almost immediately to liquefy the alcohol or other suitable fluid, thus permitting the contraction of the expansion chamber. The spring $d'$ initially elevates the valve stem $d$ sufficiently to enclose the vent $e$ within the gland $e^2$ before the valve-part $c$ is raised from its seat, so that the steam will not have reverse access to the expansion chamber and cause its premature operation. Thus the main or controlled steam valve will remain open and permit the flow of the heating medium without interference by the associated automatic mechanism above described.

In Fig. 1 I have shown the elements of a system of heat control embodying my invention, although in somewhat diagrammatic manner, for the purposes of illustration. Therein a radiator $n$ is equipped with the improved valve $o$ of my invention; steam being supplied through the inlet $a'$ from a connected boiler to the exit $a''$ of the valve casing, as heretofore described, and, alternatively, through the by-pass $k$. Thermostat $p$ of any suitable type is adapted to close the circuit through the electromagnet $m$ and conductors $p'$, $p''$, including the battery $q$ for energizing said electromagnet. Thus the valve mechanism of my invention is placed under the automatic control of said thermostat or any other desired circuit-changing or switching appliance, with the results already stated above in this specification.

From the foregoing it will be appreciated that the controlling apparatus is greatly simplified in accordance with the features of my invention, as compared with thermostatically-controlled heating appliances now upon the market and in common use. Accordingly, the system and apparatus I have invented and disclosed in a typical installation, as above, may be employed with material savings in expense for both introduction and upkeep.

Having now described the apparatus of preferred structure embodying my invention, I claim as new and desire to secure by Letters Patent, together with such modifications as may be made with the exercise of ordinary skill in the art, the following:

1. In a valve mechanism of the class described, the combination with a valve casing and a movable valve-part and its seat disposed therein, of an expansion member, a ported connecting-stem uniting the member with said valve-part for actuation and venting into said casing, closure means therefor whereby the port is closed when the valve-part is lifted from its seat, and thermostatic controlling means for the valve mechanism, substantially as set forth.

2. In a controlling valve device of the class described, the combination with a valve-casing and its closure member, of a thermostatic expansion chamber connected for the actuation of the closure member, a casing therefor, and a controllable vent connecting the expansion chamber casing with the valve-casing, said vent being arranged to be closed by the opening movement of the closure member, substantially as set forth.

3. In a controlling valve device of the class described, the combination with a valve-casing and its closure member, of a thermostatic expansion chamber connected for the actuation of said closure member, a casing therefor, a controllable vent connecting the expansion chamber casing with the valve-casing, and a spring interposed between the closure member and its connection with the expansion chamber, said vent being adapted to be closed by the opening movement of the valve closure member, substantially as set forth.

4. Valve-actuating means of the class described, comprising a thermostatic expansion chamber, a normally closed casing therefor, thermostatically controlled means for admitting a heating medium to said casing and for disconnecting it therefrom, and means, comprising a reentering open heat-conducting chamber, for rapidly dissipating the heat from said expansion chamber, substantially as set forth.

5. A system of heat control, including a source of heat-supplying medium, a governing valve therefor and its casing, an actuating expansion chamber for said valve, a casing therefor, a controllable vent connecting said expansion chamber casing with the valve casing, and automatic means for connecting the source of heat supplying medium with the expansion chamber casing and for disconnecting it therefrom, said vent being arranged to be closed by the opening movement of the governing valve, substantially as set forth.

In testimony whereof I do now affix my signature.

HAL T. PATTON.